US009923405B2

(12) United States Patent
Von Novak, III et al.

(10) Patent No.: US 9,923,405 B2
(45) Date of Patent: Mar. 20, 2018

(54) METHOD AND APPARATUS FOR WIRELESS POWER IN-BAND SIGNALING BY LOAD GENERATION

(71) Applicant: QUALCOMM Incorporated, San Diego, CA (US)

(72) Inventors: William Henry Von Novak, III, San Diego, CA (US); Linda Stacey Irish, San Diego, CA (US)

(73) Assignee: QUALCOMM Incoporated, San Diego, CA (US)

( * ) Notice: Subject to any disclaimer, the term of this patent is extended or adjusted under 35 U.S.C. 154(b) by 220 days.

(21) Appl. No.: 14/825,592

(22) Filed: Aug. 13, 2015

(65) Prior Publication Data
US 2016/0197486 A1 Jul. 7, 2016

Related U.S. Application Data

(60) Provisional application No. 62/100,642, filed on Jan. 7, 2015.

(51) Int. Cl.
H02J 5/00 (2016.01)
H02J 7/02 (2016.01)
H04B 5/00 (2006.01)
H02J 50/12 (2016.01)

(52) U.S. Cl.
CPC .............. H02J 7/025 (2013.01); H02J 50/12 (2016.02); H04B 5/0031 (2013.01); H04B 5/0037 (2013.01)

(58) Field of Classification Search
None
See application file for complete search history.

(56) References Cited

U.S. PATENT DOCUMENTS

| 2012/0153742 | A1  | 6/2012 | Lee et al. |
| 2013/0127253 | A1* | 5/2013 | Stark ................... A61N 1/3787 307/104 |
| 2013/0147279 | A1  | 6/2013 | Muratov |
| 2013/0221911 | A1  | 8/2013 | Low et al. |
| 2014/0265610 | A1  | 9/2014 | Bakker et al. |

FOREIGN PATENT DOCUMENTS

| WO | WO-2013169356 A1 | 11/2013 |
| WO | WO-2015057923 A1 | 4/2015 |

OTHER PUBLICATIONS

International Search Report and Written Opinion—PCT/US2015/064735—ISA/EPO—dated Feb. 24, 2016.

* cited by examiner

Primary Examiner — Jared Fureman
Assistant Examiner — Aqeel Bukhari
(74) Attorney, Agent, or Firm — Knobbe, Martens, Olson & Bear, LLP

(57) ABSTRACT

Exemplary implementations are directed to wireless power in-band signaling by load generation. An apparatus for communicating with a wireless power transmitter is provided. The apparatus comprises a receiver configured to generate a voltage based on wirelessly received charging power from the transmitter. The apparatus comprises a load configurable to be coupled to and decoupled from the receiver. The apparatus comprises a switching circuit configured to encode a communication to the transmitter by adjusting an average power dissipated by the load detectable by the transmitter. The average power is based on a duty cycle with which the switching circuit couples and decouples the load from the receiver under control of a control signal.

22 Claims, 7 Drawing Sheets

METHOD AND APPARATUS FOR WIRELESS POWER IN-BAND SIGNALING BY LOAD GENERATION

CROSS REFERENCE TO RELATED APPLICATIONS

This Application claims priority to Provisional Application No. 62/100,642 entitled "METHOD AND APPARATUS FOR WIRELESS POWER IN-BAND SIGNALING BY LOAD GENERATION" filed Jan. 7, 2015. The disclosure of Provisional Application No. 62/100,642 is hereby expressly incorporated in its entirety by reference herein.

FIELD

The present application relates generally to wireless power transfer, and more specifically, to methods and apparatuses for wireless power in-band signaling by load generation.

BACKGROUND

Approaches are being developed that use over the air power transmission between a transmitter and a chargeable device. One such approach is based on inductive coupling between a transmit coupler embedded, for example, in a "charging" mat or surface and a receive coupler plus rectifying circuit embedded in the chargeable device. As will be understood by a person having ordinary skill in the art, a first device, such as a wireless power receiver, may communicate with one or more other devices, such as a wireless power transmitter, by modulating a load of the receiver. This communication may be referred to as "reverse link signaling" or "in-band signaling." In many applications, receivers are cost- and size-constrained. Further, since the receivers are often moved with respect to the transmitter, coupling as well as induced voltages in either or both of the transmitter and receiver may be highly variable. Therefore, a need exists for methods and apparatuses for reliable wireless power in-band signaling by load generation, particularly for receivers configured for different applications.

SUMMARY

An apparatus for communicating with a wireless power transmitter is provided. The apparatus comprises a receiver configured to generate a voltage based on wirelessly received charging power from the transmitter. The apparatus comprises a load configurable to be coupled to and decoupled from the receiver. The apparatus comprises a switching circuit configured to encode a communication to the transmitter by adjusting an average power dissipated by the load detectable by the transmitter. The average power is based on a duty cycle with which the switching circuit couples and decouples the load from the receiver under control of a control signal.

A method of communicating between a wireless power transmitter and a wireless power receiver is provided. The method comprises wirelessly receiving charging power from the transmitter to generate a voltage at the receiver. The method comprises encoding a communication to the transmitter by adjusting an average power dissipated by a load of the receiver detectable by the transmitter, the average power based on a duty cycle at which the load is coupled to and decoupled from the receiver under control of a control signal.

An apparatus for communicating between a wireless power transmitter and a wireless power receiver is provided. The apparatus comprises means for generating a voltage based on wirelessly received charging power from the transmitter. The apparatus comprises means for encoding a communication to the transmitter by adjusting an average power dissipated by a load of the apparatus detectable by the transmitter, the average power based on a duty cycle with which the means for encoding the communication couples and decouples the load from the apparatus under control of a control signal.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure. Moreover, the term "exemplary" as used herein does not necessarily denote a preferred implementation, but rather denotes a non-limiting example of a particular implementation.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

The terminology used herein is for the purpose of describing particular implementations only and is not intended to be limiting of the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
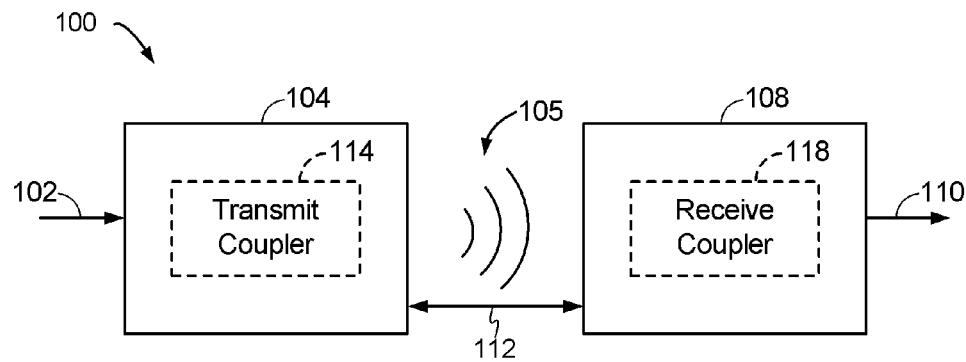
FIG. 1 is a functional block diagram of a wireless power transfer system, in accordance with some implementations.

FIG. 1 is a functional block diagram of a wireless power transfer system 100, in accordance with some implementations. Input power 102 may be provided to a transmitter 104 from a power source (not shown) to generate a time varying wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 may include a transmit coupler 114 for coupling energy to the receiver 108. The receiver 108 may include a receive coupler 118 for receiving or capturing energy transmitted from the transmitter 104. Both the transmitter 104 and the receiver 108 are separated by a distance 112. Transfer of energy occurs by coupling energy from the wireless field 105 of the transmit coupler 114 to the receive coupler 118, residing in the vicinity of the wireless field 105, rather than propagating the energy from the transmit coupler 114 into free space.

In one example implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance. Resonant inductive coupling techniques may thus allow for improved efficiency and power transfer over various distances and with a variety of inductive coupler configurations. However, even when resonance between the transmitter 104 and receiver 108 are not matched, energy may be transferred, although the efficiency may be affected. For example, the efficiency may be less when resonance is not matched.

According to some aspects, the wireless field 105 may correspond to the "near-field" of the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114.

Figure 2:
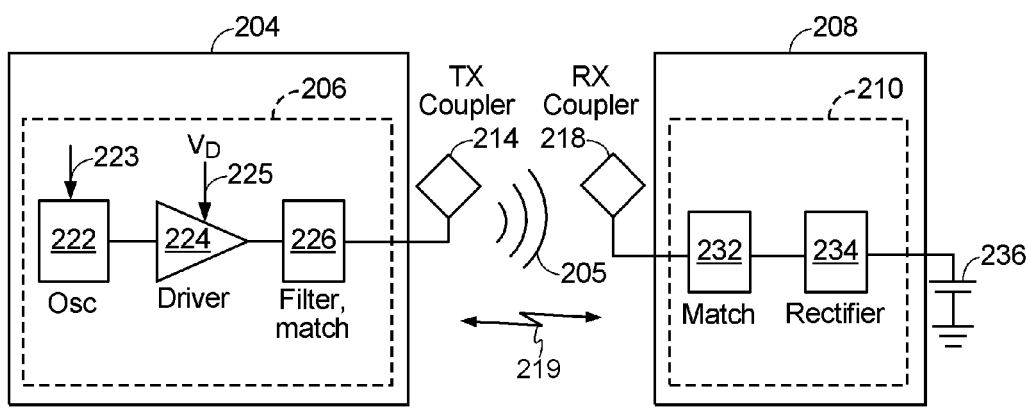
FIG. 2 is a functional block diagram of a wireless power transfer system, in accordance with some other exemplary implementations.

FIG. 2 is a functional block diagram of a wireless power transfer system 200, in accordance with some other exemplary implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 may filter out harmonics or other unwanted frequencies and match the impedance of the transmitter 204 to the impedance of the transmit coupler 214. As a result of driving the transmit coupler 214, the transmit coupler 214 may generate a wireless field 205 to wirelessly output power at a level sufficient for charging a battery 236, for example.

The receiver 208 may include a receive circuitry 210 that may include a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
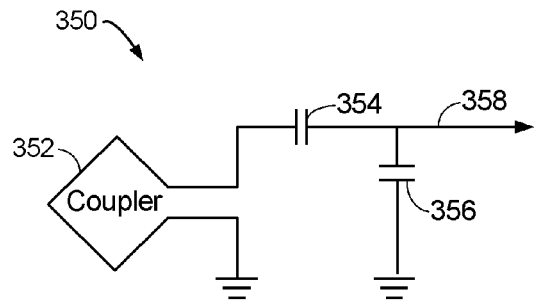
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with some implementations. As illustrated in FIG. 3, a transmit or receive circuitry 350 may include a coupler 352. The coupler 352 may also be referred to or be configured as a "conductor loop" or as a "magnetic" coupler. The term "coupler" generally refers to a component that may wirelessly output or receive energy for coupling to another "coupler." In some implementations, a coupler may be a coil or an antenna configured to generate wireless field for wirelessly coupling power to another coupler.

The resonant frequency of the loop or magnetic couplers is based on the inductance and capacitance of the loop or magnetic coupler. Inductance may be simply the inductance created by the coupler 352, whereas, capacitance may be added via a capacitor (or the self-capacitance of the coupler 352) to create a resonant structure at a desired resonant frequency. As a non-limiting example, a capacitor 354 and a capacitor 356 may be added to the transmit or receive circuitry 350 to create a resonant circuit that resonates at a resonant frequency. For transmit couplers, the signal 358, with a frequency that substantially corresponds to the resonant frequency of the coupler 352, may be an input to the coupler 352. For receive couplers, the signal 358 may be output for use in powering or charging a load.

Figure 4:
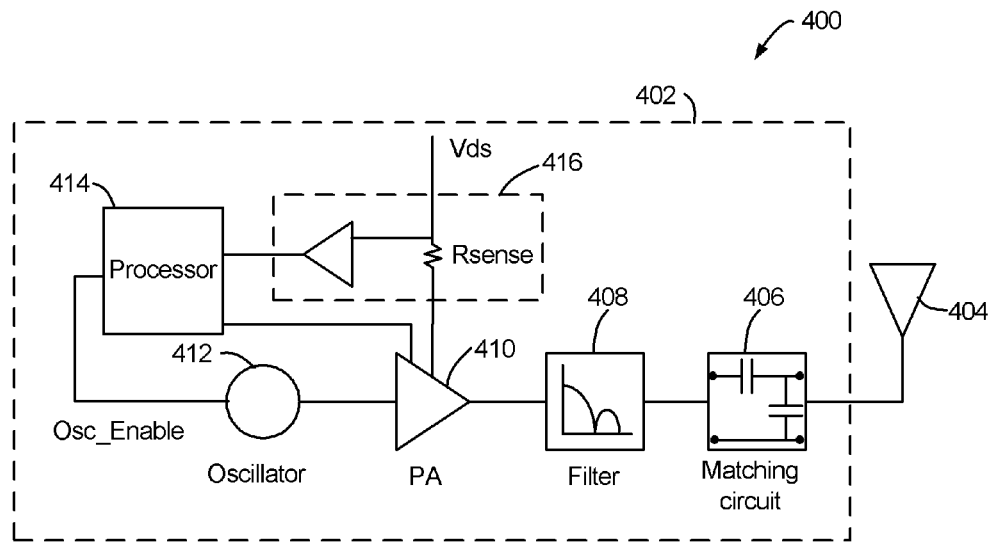
FIG. 4 is a simplified block diagram of a wireless power transmitter, in accordance with some implementations.

FIG. 4 is a simplified block diagram of a transmitter 400, in accordance with some implementations. A transmitter 400 includes a transmit circuitry 402 and a transmit coupler 404. Generally, the transmit circuitry 402 provides power to the transmit coupler 404 by providing an oscillating signal resulting in generation of near-field magnetic energy about the transmit coupler 404. By way of example, the transmitter 400 may operate within the 6.78 MHz or 13.56 MHz ISM band.

The transmit circuitry 402 may include a fixed impedance matching circuit 406 for matching the impedance of the transmit circuitry 402 (e.g., 50 ohms) to the impedance of the transmit coupler 404 and a low pass filter 408 configured to reduce harmonic emissions to levels to prevent self-jamming of devices coupled to the receivers 108 (FIG. 1). Other implementations may include different filter topologies, including but not limited to, notch filters that attenuate specific frequencies while passing others and may include an adaptive impedance match, that can be varied based on measurable transmit metrics, such as output power to the coupler or DC current draw by the power amplifier 410. The transmit circuitry 402 further includes a power amplifier 410 configured to drive a signal as determined by an oscillator 412. The transmit circuitry may comprise discrete devices or circuits, or alternately, may comprise an integrated assembly. An exemplary power output from transmit coupler 404 may be on the order of 1 to 20 Watts.

The transmit circuitry 402 further includes a processor 414 (or controller) for enabling the oscillator 412 during transmit phases (or duty cycles) for specific receivers, for adjusting the frequency of the oscillator 412, and for adjusting the output power level for implementing a communication protocol for interacting with neighboring devices through their attached receivers. In some implementations, the processor 414 may be a micro-controller. In other implementations, the processor 414 may be implemented as an application-specific integrated circuit (ASIC). The processor 414 may be operably connected, directly or indirectly, to each component of the transmit circuitry 402. The processor 414 may be further configured to receive information from each of the components of the transmit circuitry 402 and perform calculations based on the received information. The processor 414 may be configured to generate control signals for each of the components that may adjust the operation of that component. As such, the processor 414 may be configured to adjust the power transfer based on a result of the calculations performed by it. A memory (not shown) may further be included operably connected to the processor 414 and may be configured to temporarily or permanently store data for use in read and write operations performed by the processor 414.

The transmit circuitry 402 may further include a load sensing circuit 416 for detecting the presence or absence of active receivers in the vicinity of the near-field generated by transmit coupler 404. By way of example, a load sensing circuit 416 monitors the current flowing to the power amplifier 410, which is affected by the presence or absence of active receivers in the vicinity of the near-field generated by the transmit coupler 404. Detection of changes to the loading on the power amplifier 410 are monitored by the processor 414 for use in determining whether to enable the oscillator 412 for transmitting energy to communicate with an active receiver, as well as for sensing communications from the receiver that are encoded by the receiver modulating its loading on the transmitter 400.

The transmit coupler 404 may be implemented as an antenna strip with the thickness, width and metal type selected to keep resistive losses low. The transmit coupler 404 can generally be configured for association with a larger structure such as a table, pad, mat, lamp or other less portable configuration. Accordingly, the transmit coupler 404 generally will not need "turns" in order to be of a practical dimension.

Figure 5:
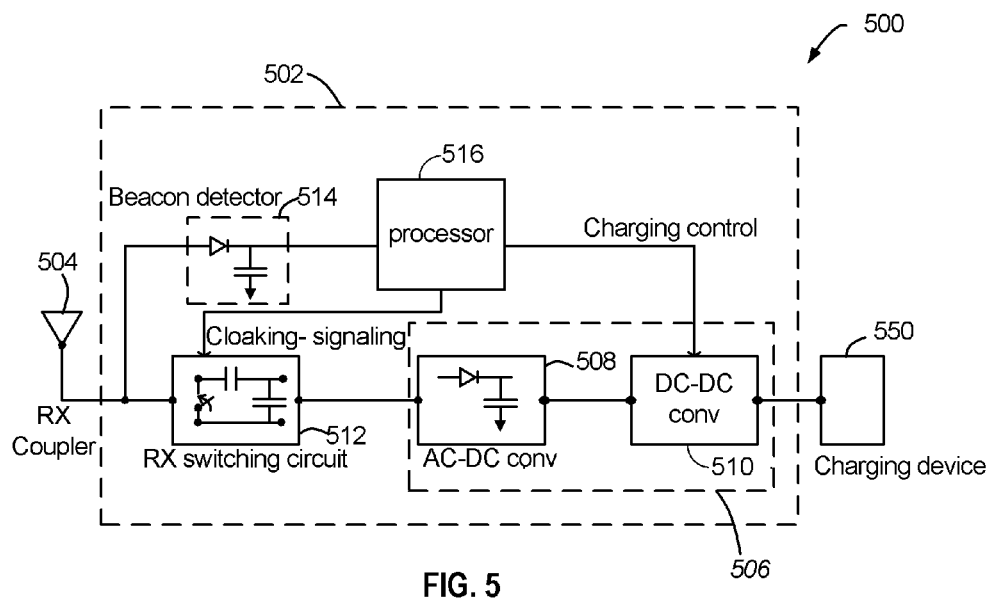
FIG. 5 is a block diagram of a wireless power receiver, in accordance with some implementations.

FIG. 5 is a block diagram of a receiver 500, in accordance with some implementations. A receiver 500 includes a receive circuitry 502 and a receive coupler 504. The receiver 500 further couples to the device 550 for providing received power thereto. It should be noted that the receiver 500 is illustrated as being external to the device 550 but may be integrated into the device 550. Generally, energy is propagated wirelessly to the receive coupler 504 and then coupled through the receive circuitry 502 to the device 550.

The receive coupler 504 may be tuned to resonate at the same frequency, or near the same frequency, as the transmit coupler 404 (FIG. 4). The receive coupler 504 may be similarly dimensioned with the transmit coupler 404 or may be differently sized based upon the dimensions of an associated device 550. By way of example, the device 550 may be a portable electronic device having diametric or length dimension smaller that the diameter of length of the transmit coupler 404. In such an implementation, the receive coupler 504 may be implemented as a multi-turn coupler in order to reduce the capacitance value of a tuning capacitor (not shown) and increase the receive coupler's impedance. By way of example, the receive coupler 504 may be placed around the substantial circumference of the device 550 in order to maximize the coupler diameter and reduce the number of loop turns (i.e., windings) of the receive coupler and the inter-winding capacitance.

The receive circuitry 502 provides an impedance match to the receive coupler 504. The receive circuitry 502 includes a power conversion circuitry 506 for converting received energy into charging power for use by the device 550. The power conversion circuitry 506 includes an AC-to-DC converter 508 and may also in include a DC-to-DC converter 510. The AC-to-DC converter 508 rectifies the energy signal received at the receive coupler 504 into a non-alternating power while the DC-to-DC converter 510 converts the rectified energy signal into an energy potential (e.g., voltage) that is compatible with the device 550. Various AC-to-DC converters are contemplated including partial and full rectifiers, regulators, bridges, doublers, as well as linear and switching converters.

The receive circuitry 502 may further include a switching circuitry 512 for connecting the receive coupler 504 to the power conversion circuitry 506 or alternatively for disconnecting the power conversion circuitry 506. Disconnecting the receive coupler 504 from the power conversion circuitry 506 not only suspends charging of the device 550, but also changes the "load" as "seen" by the transmitter 400 (FIG. 4) as is explained more fully below. As disclosed above, the transmitter 400 includes the load sensing circuit 416 which detects fluctuations in the bias current provided to the transmitter power amplifier 410. Accordingly, the transmitter 400 has a mechanism for determining when receivers are present in the transmitter's near-field as well as for sensing communications from the receiver that are based on modulation of the receiver's load on the transmitter 400.

In some implementations, communication between the transmitter 400 and the receiver 500 refers to a device sensing and charging control mechanism, rather than conventional two-way communication. In other words, for example, the transmitter 400 may use on/off keying of the transmitted signal to adjust whether energy is available in the near-field. The receivers 500 interpret these changes in energy as a message from the transmitter 400. From the receiver side, the receiver 500 uses tuning and de-tuning of the receive coupler 504, or addition of an intentional load as will be described in more detail in connection with FIGS. 6-14, to adjust how much power is being accepted from the near-field. The transmitter 400 can detect this difference in power used from the near field and interpret these changes as a message from the receiver 500.

The receive circuitry 502 may further include a signaling beacon circuitry 514 used to identify received energy fluctuations, which may correspond to informational signaling from the transmitter 400 to the receiver 500. Furthermore, the signaling and beacon circuitry 514 may also be used to detect the transmission of a reduced energy signal (i.e., a beacon signal) and to rectify the reduced energy signal into a nominal power for awakening either un-powered or power-depleted circuits within the receive circuitry 502 in order to configure the receive circuitry 502 for wireless charging.

The receive circuitry 502 further includes a processor 516 for coordinating the processes of the receiver 500 described herein including the control of the switching circuitry 512 described herein. The processor 516 may have similar features/configurations as the processor 414 described above with reference to FIG. 4 and the receive circuitry 502 may further include a memory (not shown) as described above with reference to FIG. 4.

Figure 6:
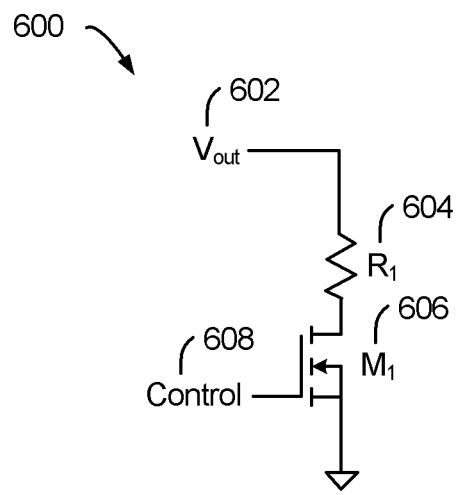
FIG. 6 is a schematic diagram of a load generating circuit of a wireless power receiver.

FIG. 6 is a schematic diagram of a load generating circuit 600 of a wireless power receiver. As shown in FIG. 6, a voltage ($V_{out}$) 602 may be applied to a first terminal of a resistor ($R_1$) 604, the second terminal of the resistor 604 being electrically connected to a drain of an NMOS FET ($M_1$) 606. In accordance with exemplary embodiments described herein, the voltage $V_{out}$ may refer to a voltage being input to the DC-DC converter 510 of FIG. 5 (e.g., the voltage being output from the rectifier 508). The source of the FET 606 is connected to a ground voltage, while a control signal 608 is provided to a gate of the FET 606. A wireless power receiver comprising the circuit 600 may adjust a load, as sensed by the transmitter 400 (FIG. 4), at the output of the rectifier within the receiver by switching the resistor 604 in and out of the circuit 600 based on the control signal 608 provided to the gate of the FET 606. As just described, the control signal may cause adjustment of the load (e.g., the resistor 604) in the receiver that may be carried out according to a characteristic pattern. When the load at the receiver is adjusted while coupling power via the wireless power field, changes in power drawn via the field based on the changes in the load may be detected at the transmitter 400 (FIG. 4) (e.g., as a change in current or power drawn from a circuit driving the transmit coil). As the control signal may cause adjustment of the load at the receiver according to a characteristic pattern, the transmitter may detect the changes in loading according to the characteristic pattern and interpret the characteristic pattern as a message from the receiver.

However, it is common for the voltage $V_{out}$ 602 to have a range of 2 to 1, or even 3 to 1 (e.g., due to variations in coupling via the field or other adjustments of power at the transmitter). Since power dissipated in a resistor (e.g., the resistor 604) is equal to $V^2/R$, where V is the voltage drop across the resistor 604 and R is the resistance of the resistor 604, a range of power dissipation in the resistor 604 will be as high as 9 to 1 (e.g., $3^2=9$). Thus, it may be difficult to design a system that is configured to detect very small power changes (e.g., at low $V_{out}$ voltages) and also supply a very high power level (e.g., at high $V_{out}$ voltages). In addition, it is difficult for small devices to dissipate large amounts of power. Thus, a different solution that provides a relatively constant power dissipation at the load is desirable for accomplishing in-band signaling in a wireless power charging system. In each of the following implementations, it may be assumed that an external system provides an ON/OFF control that modulates the load.

Figure 7:
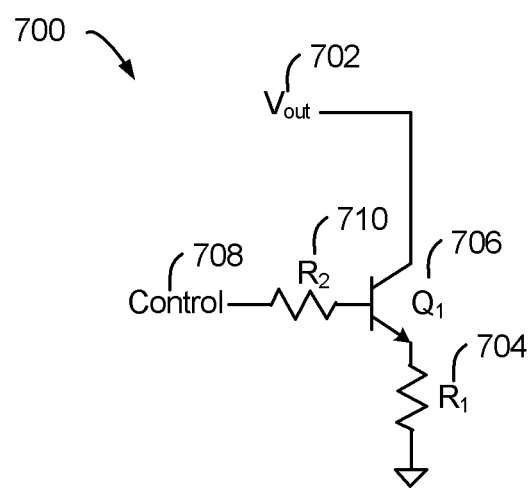
FIG. 7 is a schematic diagram of a current source load generating circuit of a wireless power receiver, in accordance with some implementations.

FIG. 7 is a schematic diagram of a current source load generating circuit 700 of a wireless power receiver, in accordance with some implementations. As shown in FIG. 7, a design utilizing a single switch 706 (e.g., an NPN bipolar junction transistor $Q_1$) may be connected in a current source configuration. For example, a voltage $V_{out}$ 702 (e.g., the voltage at the output of the rectifier 508 or at the input of the DC-DC converter 510 (FIG. 5)) may be connected to a collector of the switch 706, while an emitter of the switch 706 may be connected to a ground voltage. In order to control the current passing between the collector and the emitter, a control signal 708 may be provided to a first terminal of a resistor ($R_2$) 710, the other terminal of the resistor 710 connected to a base of the switch 706. In such implementations, when an appropriate base-to-emitter voltage is provided to the switch 706 by the control signal 708, a voltage equal to the driving voltage plus a threshold voltage will be maintained across the resistor 704. Since this voltage across the resistor 704 will be substantially static, a constant current will be drawn through the switch 706. This provides at least the benefit of a reduced power dissipation range versus voltage and a lower part count.

Figure 8:
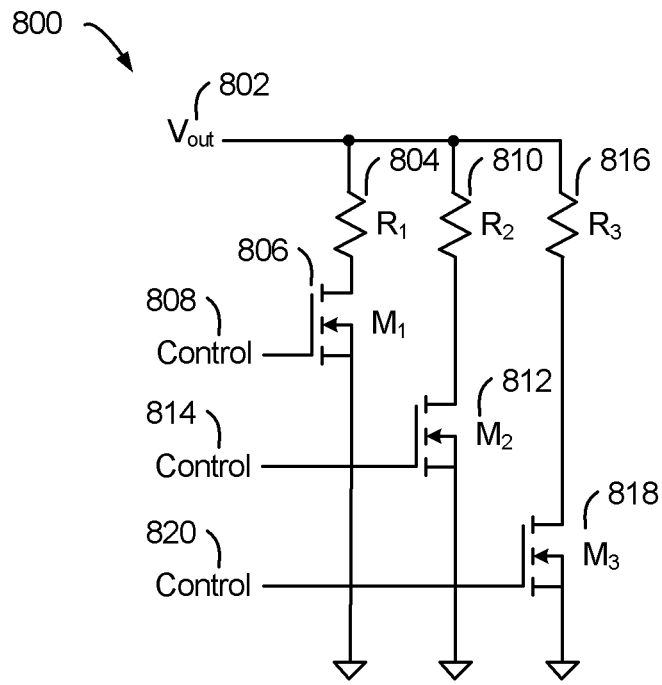
FIG. 8 is a schematic diagram of a multiple resistive load generating circuit of a wireless power receiver, in accordance with some implementations.

In some other implementations, it may be beneficial or cost-effective to integrate active components (e.g., switches) into an ASIC or other monolithic device. In such cases, low active device dissipation may be desired and additional external components may be acceptable. FIG. 8 is a schematic diagram of a multiple resistive load generating circuit 800 of a wireless power receiver, in accordance with some implementations. As shown in FIG. 8, a voltage $V_{out}$ 802 may be provided to a first terminal of each of a first resistor ($R_1$) 804, a second resistor ($R_2$) 810, and a third resistor ($R_3$) 816. A second terminal of each of the first 804, second 810, and third 816 resistors may be connected to a drain of a respective one of a first FET ($M_1$) 806, a second FET ($M_2$) 812, and a third FET ($M_3$) 818. The source of each of the first 806, second 812, and third 818 FETs may be connected to a ground voltage. A first control signal 808 may be provided to a gate of the first FET 806, a second control signal 814 may be provided to a gate of the second FET 806, and a third control signal 820 may be provided to a gate of the third FET 818. In some implementations, the FETs 806, 812 and 818 may be located within the ASIC, such that the only external components are the resistors 804, 810 and 816. In some implementations, the arrangement of FIG. 8 may provide binary stepped loading (e.g., with 2 stages there are 3 states plus the open state; with 3 stages there are 7 states plus the open state). Such a wide resistance variation may allow a controller (e.g., the processor 516 of FIG. 5) to select a resistance that provides the desired load. In some implementations, the resistance of the resistors 804, 810, 816 may be related to one another by factors of two (e.g., $R_3=2R_2=4R_1$). Benefits of such implementations may include but are not limited to easy integration into an ASIC, external parts being small and inexpensive resistors, and dissipation of power substantially only in passive components (e.g., in the resistors and not in the FETs). Some level of intelligence for selecting which switches (e.g., which FETs 806, 812 and 818) to open and close may be provided in the controller (see, e.g., the processor 516 of FIG. 5). Adjustment in such a binary fashion may also be a somewhat coarse adjustment.

Figure 9:
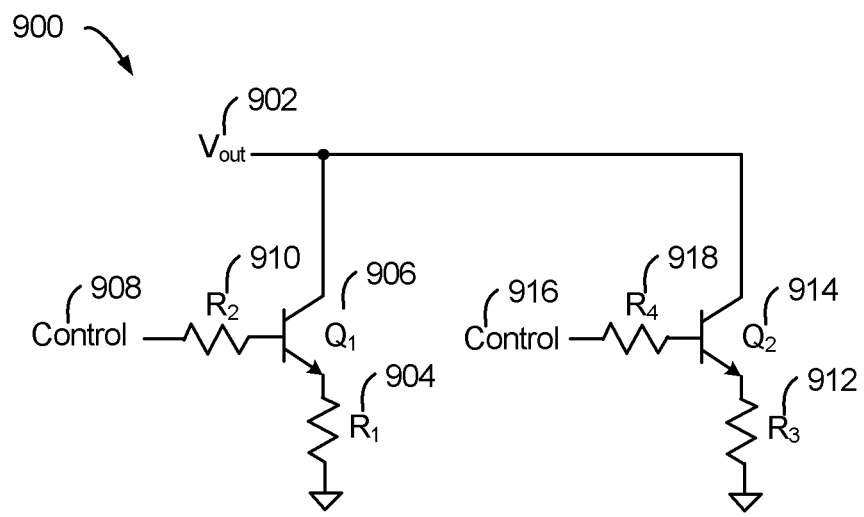
FIG. 9 is a schematic diagram of a multiple current source switch load generating circuit of a wireless power receiver, in accordance with some implementations.

The concepts of FIGS. 7 and 8 may be combined, as shown by FIG. 9. FIG. 9 is a schematic diagram of a multiple current source switch load generating circuit 900 of a wireless power receiver, in accordance with some implementations. As shown in FIG. 9, a voltage $V_{out}$ 902 may be provided to a collector of each of a first BJT ($Q_1$) 906 and a second BJT ($Q_2$) 914. An emitter of the first BJT 906 may be connected to a first terminal of a resistor ($R_1$) 904, while a second terminal of the resistor 904 may be connected to a ground voltage. An emitter of the second BJT 914 may be connected to a first terminal of a resistor ($R_3$) 912, while a second terminal of the resistor 912 may be connected to a ground voltage. A first control signal 908 may be provided to a first terminal of a resistor 910 ($R_2$), while a second terminal of the resistor 910 is connected to a base of the first BJT 906. A second control signal 916 may be provided to a first terminal of a resistor ($R_4$) 918, while a second terminal of the resistor 918 is connected to a base of the second BJT 918. Thus, the first 906 and second 914 BJTs function as first and second current sources, as previously described in connection with FIG. 7, and may be turned ON and OFF by a control circuit (not shown) in a binary fashion based on the first 908 and second 916 digital control signals, such that a desired current (and thus the desired power based on voltage) may be drawn from $V_{out}$. Implementations according to FIG. 9 may provide finer adjustment since power dissipation in each constant current load increases by VI rather than by $$\frac{V^2}{R},$$

and may require fewer outputs, in comparison to FIG. 8.

Figure 10:
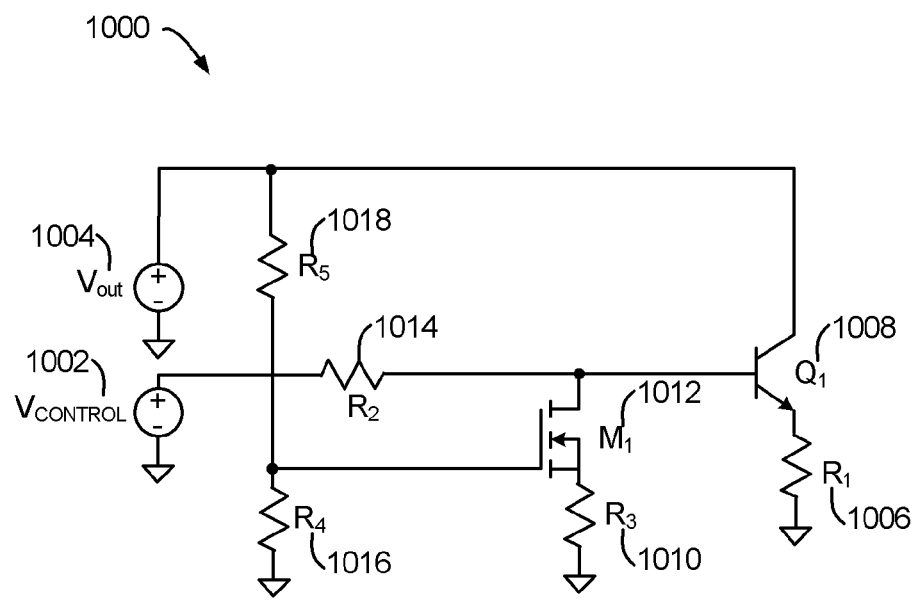
FIG. 10 is a schematic diagram of a two-state load generating circuit of a wireless power receiver, in accordance with some implementations.

Some further implementations may include a load that utilizes a constant current source having two states. FIG. 10 is a schematic diagram of a two-state load generating circuit 1000 of a wireless power receiver, in accordance with some implementations. As shown in FIG. 10, a first voltage source 1002 may provide a control signal (e.g., voltage $V_{CONTROL}$) to a first terminal of a resistor ($R_2$) 1014. A second voltage source 1004 may provide a voltage $V_{out}$ to a first terminal of a resistor ($R_5$) 1018 and to a collector of a BJT ($Q_1$) 1008. A second terminal of the resistor 1018 may be connected to a first terminal of a resistor ($R_4$) 1016 and to a gate of a FET ($M_1$) 1012. A second terminal of the resistor 1016 may be connected to a ground voltage. A source of the FET 1012 may be connected to a second terminal of the resistor 1014 and to a base of the BJT 1008. An emitter of the BJT 1008 may be connected to a first terminal of a resistor 1006, while a second terminal of the resistor 1006 may be connected to a ground voltage. A drain of the FET 1012 may be connected to a first terminal of a resistor 1010, a second terminal of the resistor 1010 connected to a ground voltage.

In operation, in a first state, the current source formed by the resistor 1006 and the BJT 1008 is turned on by the control signal $V_{CONTROL}$ presenting a suitable voltage to the base of the BJT 1008. In a second state, the FET 1012 will significantly pull down a level of the control signal at the base of the BJT 1008, which conducts when the receiver voltage $V_{out}$ exceeds a threshold value. This threshold value is set by the voltage divider formed by resistors 1016 and 1018. Thus, as the voltage, and thus power dissipated in the resistor 1006 rises before a predetermined power limit is reached, the FET 1012 begins conducting and reduces the current drawn by the current source (e.g., the BJT 1008). The actual voltage that reduces the current drawn by the BJT 1008 is the voltage at the first terminal of the resistor 1016, which is linearly proportional to the voltage $V_{out}$. Benefits of such implementations are that only an ON/OFF signal (e.g., $V_{CONTROL}$) is needed.

Figure 11:
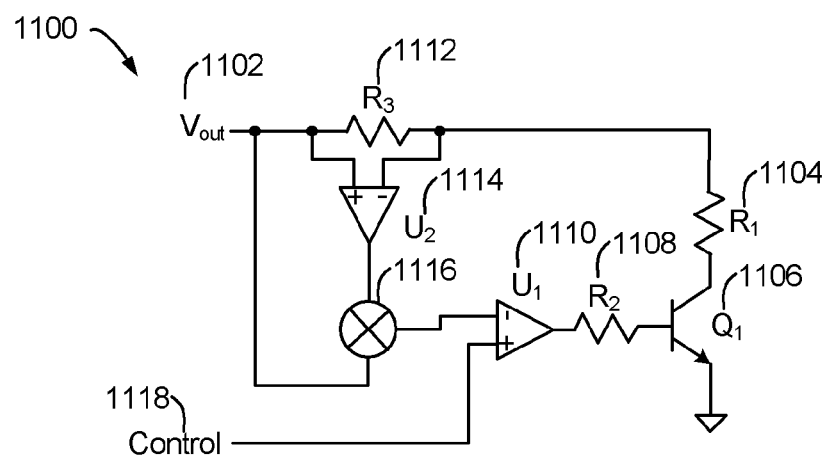
FIG. 11 is a schematic diagram of yet another load generating circuit of a wireless power receiver comprising a constant power load, in accordance with some implementations.

In some implementations, a constant power load may utilize a current sensor, a multiplier and an op-amp to ensure that power dissipation remains close to a set point provided by a control circuit. FIG. 11 is a schematic diagram of yet another load generating circuit 1100 of a wireless power receiver comprising a constant power load, in accordance with some implementations. As shown in FIG. 11, a voltage ($V_{out}$) 1102 is provided to a first terminal of a resistor ($R_3$) 1112, the second terminal of the resistor 1112 connected to a first terminal of a resistor ($R_1$) 1104. The second terminal of the resistor 1104 is connected to a collector of a BJT 1106, while an emitter of the BJT 1106 is connected to a ground voltage. A non-inverting input of an op-amp ($U_2$) 1114 is connected to the first terminal of the resistor 1112 and an inverting input of the op-amp 1114 is connected to the second terminal of the resistor 1112. In this way, the op-amp 1114 may function as a current sensor configured to measure a current flowing through the load (e.g., the resistor 1104 and the BJT 1106) by detecting the voltage drop across the resistor 1112 having the known resistance $R_3$ and outputting a signal proportional to the current passing through the resistor 1112. The output signal from the op-amp 1114 and the voltage $V_{out}$ are multiplied together at a multiplier 1116, the output of which is substantially equivalent to a power dissipation measurement of the circuit 1100. Thus, the multiplier 1116 is configured to determine the average power by multiplying the voltage $V_{out}$ by the current measured by the op-amp 1114. The output of the multiplier 1116 is fed to an inverting input of another op-amp ($U_1$) 1110 (e.g., a driver circuit), while a control signal 1118 is input to the non-inverting input of the op-amp 1110. The output of the op-amp 1110 is input to a first terminal of a resistor ($R_2$) 1108, a second terminal of the resistor 1108 input to a base of the BJT 1106. Thus, the driver circuit (e.g., the op-amp 1110) is configured to control the switching circuit (e.g., at least the BJT 1106) based on the determined average power. The control signal may comprise a digital signal that, when representing logical high, may enable a fairly precise load for the wireless receiver (not shown), by turning on the BJT 1106.

Figure 12:
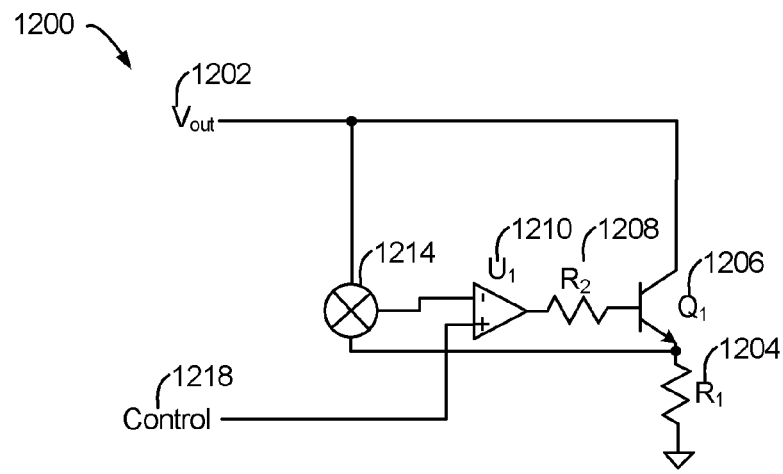
FIG. 12 is a schematic diagram of another load generating circuit of a wireless power receiver comprising a constant power load, in accordance with some implementations.

In other variations of the above implementations, the functions of the sense resistor (e.g., the resistor 1112) and the load resistor (e.g., the resistor 1104) may be combined into a single resistor, and one of the two op-amps (e.g., the op-amp 1114) may be eliminated. FIG. 12 is a schematic diagram of a load generating circuit 1200 of a wireless power receiver comprising another constant power load, in accordance with some implementations. As shown in FIG. 12, the voltage $V_{out}$ 1202 is provided to one input of a multiplier 1214 and directly to a collector of a BJT (Q1) 1206. The emitter of the BJT 1206 may be connected to a first terminal of a resistor ($R_1$) 1204 that has its second terminal connected to a ground voltage. The first terminal of the resistor 1204 is also input to the multiplier 1214. Since the resistor 1204 is a ground voltage referenced, the voltage appearing at its first terminal is proportional to the load current passing through the resistor 1204. Thus, the output of the multiplier 1214 is proportional to a power dissipation in the circuit 1200 and is fed to an inverting input of an op-amp ($U_1$) 1210, a control signal 1218 being provided to the non-inverting input of the op-amp 1210. An output of the op-amp 1210 is input to a first terminal of a resistor ($R_2$) 1208, a second terminal of which is connected to a base of the BJT 1206. Thus, when the control signal 1218 has a logical high value, the op-amp 1210 outputs a voltage sufficient to turn on the current source formed by the BJT 1206 and provide a relatively constant power dissipation through the circuit 1200. In accordance with implementations of FIG. 12, control circuitry may be relatively easy to integrate into an ASIC, and power control would be very accurate. Furthermore, the design of FIG. 12 may provide increased stability in operation as compared to some other implementations.

Figure 13:
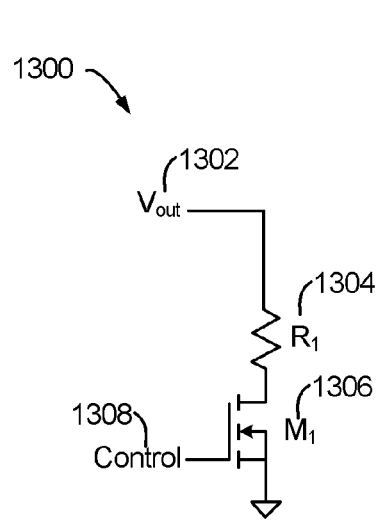
FIG. 13 is a schematic diagram of a pulse width modulation load generating circuit of a wireless power receiver, in accordance with some implementations.

In yet other implementations, an average amount of power dissipation may be achieved by rapidly turning ON and OFF a transistor in a pulse width modulated (PWM) fashion. FIG. 13 is a schematic diagram of a pulse width modulation load generating circuit 1300 of a wireless power receiver, in accordance with some implementations. As shown in FIG. 13, a voltage ($V_{out}$) 1302 is provided to a first terminal of a resistor ($R_1$) 1304. The second terminal of the resistor 1304 is connected to a drain of a FET ($M_1$) 1306, while a source of the FET 1306 is connected to a ground voltage. A control signal 1308 is directly connected to a gate of the FET 1306. A controller (not shown) may provide the control signal 1308 as a stream of high and low pulses, the duty cycle of which may be selectively adjusted between a first value and a second value greater than the first value (e.g., increased or decreased to increase or decrease, respectively, the average power dissipated in the circuit 1300). The switching circuit (e.g., the FET 1306 may be configured to electrically connect the load (e.g., the resistor 1304) to the ground voltage in a coupled state and electrically isolate the load from the ground voltage in an uncoupled state. This operation may also apply to one or more of the other implementations described in the present application. No further filtering may be required if the circuit that provides $V_{out}$ has inherent filtering properties. If the circuit that provides $V_{out}$ cannot tolerate the additional AC energy, then a switch-mode version of the circuit 1300 may be utilized to provide a smoother power waveform, as will be described in connection with FIG. 14 below.

Figure 14:
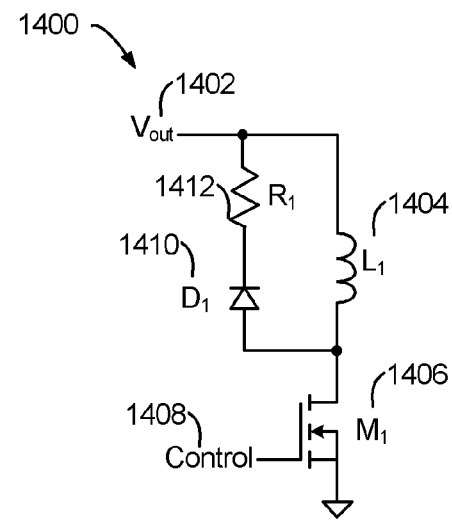
FIG. 14 is a schematic diagram of a switch-mode pulse width modulation load generating circuit of a wireless power receiver, in accordance with some implementations.

FIG. 14 is a schematic diagram of a switch-mode pulse width modulation load generating circuit 1400 of a wireless power receiver, in accordance with some implementations. As shown in FIG. 14, a voltage $V_{out}$ 1402 may be provided to a first terminal of each of a resistor ($R_1$) 1412 and an inductor ($L_1$) 1404. A second terminal of the inductor 1404 is connected to a drain of a FET ($M_1$) 1406 and to a first terminal of a diode ($D_1$) 1410. The second terminal of the diode 1410 is connected to the second terminal of the resistor 1412. The diode 1410 and the resistor 1412 provide a fly-back type operation for the circuit 1400 when the FET 1406 is rapidly turned off, providing a recirculation path for the current driven by the inductance of the inductor 1404. A control signal 1408 is input to a gate of the FET 1406 and the source of the FET 1406 is connected to a ground voltage. In operation, the control signal 1408 may rapidly alternate between high and low states with a duty cycle that may vary as previously described in connection with FIG. 13. The operation of the circuit 1400 of FIG. 14 is substantially the same as the circuit 1300 of FIG. 13 with the exception that when the FET 1406 is ON, current flows from $V_{out}$ 1402 through the inductor 1404 and the FET 1406 to a ground voltage. When the FET 1406 is OFF, the current that previously flowed through the FET 1406 is recirculated through the diode 1410 and the resistor 1412 preventing or substantially attenuating a rapid voltage spike across the FET 1406 that would otherwise occur due to the inductance of the inductor 1404 resisting any instantaneous change in current flow through the inductor 1404. Advantages of the implementations shown in FIGS. 13 and 14 may include but are not limited to power dissipation occurring in only passive components and a reduced part count.

As described above, the circuitry described with reference to FIGS. 7-14 may be incorporated into a wireless power receiver 500 (FIG. 5) as described above and be controlled in a way to encode a communication to the transmitter 400. As described above, the communication is transmitted via adjustment of a load of the receiver 500 via the circuitry described with reference to FIGS. 7-14 in a characteristic matter detectable by the transmitter 400 (e.g., via detection of changes in power draw as one example) while the receiver 500 is coupling power via a wireless field.

The encoded communication from the receiver 500 may include a variety of different forms of signaling to the transmitter 400. Various non-limiting examples of the types of the communication follow below.

In accordance with an implementation of one form of communication, the communication may be a simple indication of a presence of the receiver 500 in a charging region of the transmitter 400. For example, when there are no devices present in the charging region of the transmitter 400, the transmitter 400 may be configured to enter a low power mode (e.g., for example providing a series of low power "beacons"—such as pulses of power at a low duty cycle) and enter a higher power mode (e.g., for charging or establishing further communications) in response to detecting a short modulation of a load of the receiver 500 (e.g., "the communication") via the circuitry described with reference to FIGS. 7-14.

In another implementation, the low power "beacon" may further be provided and/or extended to supply sufficient power for the receiver 500 to establish other communication channels with the transmitter 400. The other communication channel (e.g., communication channel 219 of FIG. 2) may then be used to exchange information to determine whether power may be transferred in accordance with a higher power charging mode. In this case, the transmitter 400 may extend the length of the low power beacon (or increase an amount of power of the low power beacon or a combination thereof) in response to detecting a communication from the receiver 500. The beacon extension may allow the receiver 500 to wirelessly receive sufficient power for establishing the other communication channel and be authenticated for higher power transfer. In this case, this "communication" may correspond to a characteristic sequence of loads applied to the receiver 500 that is detectable at the transmitter 400 to trigger the transmitter 400 to extend the low power beacon. In this case, the circuitry described above with reference to FIGS. 7-14 may be controlled to apply the characteristic sequence of loads (e.g., a load variation between two power levels for a certain time interval) at the receiver 500 to provide a communication to the transmitter 400 to cause the transmitter 400 to detect the communication and extend the low power beacon. In a manner, the circuitry described above with reference to FIGS. 7-14 may provide an efficient and improved implementation for carrying out the load variation for purposes of allowing a transmitter 400 to accurately detect the presence of the receiver 500 and extend the low power beacon.

As just described, the transmitter 400 may establish an additional out of band communication channel (e.g., Bluetooth, WiFi, or the like such as channel 219 of FIG. 2) with the receiver 500 for exchanging charging control information etc. In this case, in accordance with another implementation, the transmitter 400 may confirm that the transmitter 400 is establishing communications with a receiver 500 that is within the charging region of the transmitter 400 (e.g., to prevent a cross-connection scenario where there are multiple proximate transmitters and a receiver 500 is communicating with and requesting power from a transmitter 400 but is not within the charging region of that particular transmitter 400). In this case, the "communication" described above may correspond to, for example, a characteristic load condition at the receiver 500 maintained for a certain, e.g., predetermined interval of time to confirm a presence of the receiver 500 in the charging region of the transmitter 400. As such, the circuitry described above with reference to FIGS. 7-14 may be controlled to apply the load variation pattern at the receiver 500 for a pre-determined time interval to communicate its presence in the charging region to the transmitter 400. The transmitter 400 detects the load variation (e.g., "communication") based on changes in power drawn via the field it is generating and therefore may confirm the presence of the receiver 500 when the load variation is synchronously detected along with a communication sent via the out of band channel. In a manner, the circuitry described above with reference to FIGS. 7-14 may provide an efficient and improved implementation for carrying out the load variation for purposes of allowing a transmitter 400 to accurately confirm the presence of the receiver 500 within the transmitter's charging region.

In another implementation, the in-band communication generated via the control of the circuitry described with reference to FIGS. 7-14 may correspond to any type of data messages (e.g., potentially encoded in packets or in accordance with some communication protocol) and may augment or replace the additional out-of band communication channel (e.g., a communication channel formed via an additional medium other than the field used for wireless power transfer). For example, power control messages or any other message relating to power requirements or capabilities may be sent in-band via control of the circuitry previously described with reference to FIGS. 7-14.

Figure 15:
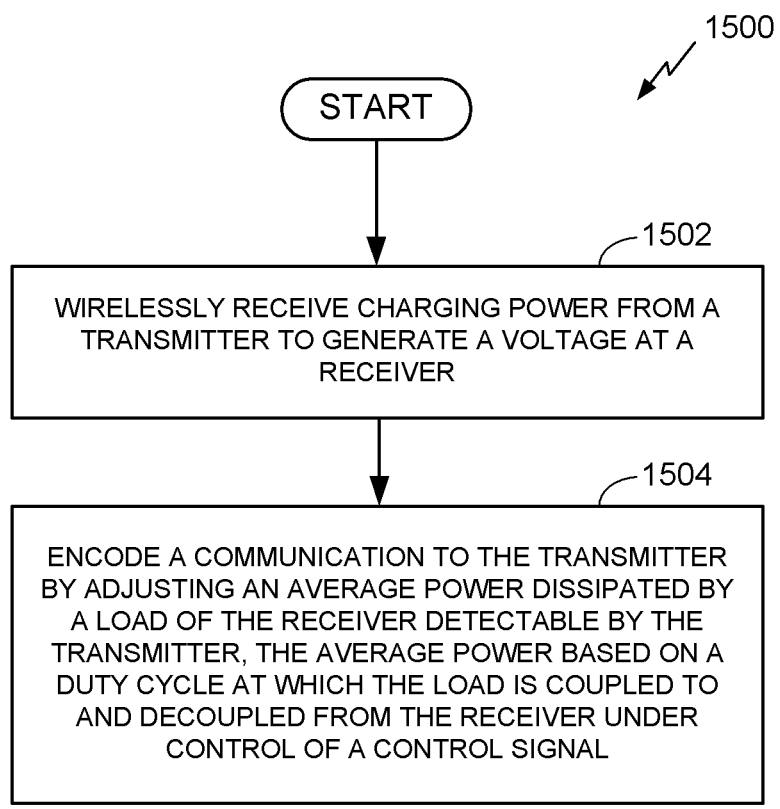
FIG. 15 is a flowchart illustrating a method, in accordance with some implementations.

FIG. 15 is a flowchart 1500 illustrating a method, in accordance with some implementations. The flowchart 1500 is described herein with reference to the circuits previously described in connection with any of FIGS. 10-14. In some implementations, one or more of the blocks in flowchart 1500 may be performed by a receiver, for example, the receiver 500 shown in FIG. 5. Although the flowchart 1500 is described herein with reference to a particular order, in various implementations, blocks herein may be performed in a different order, or omitted, and additional blocks may be added.

The flowchart 1500 may begin at the "start" block. At block 1502, the receiver 500 wirelessly receives charging power from a transmitter 400 (FIG. 4) to generate a voltage ($V_{out}$) at the receiver 500. At block 1504, the receiver 500 encodes a communication to the transmitter 400 (FIG. 4) by adjusting an average power dissipated by a load of the receiver detectable by the transmitter, the average power based on a duty cycle at which the load is coupled to and decoupled from the receiver 500 under control of a control signal. For example, as previously described in connection with FIG. 10, in a first state, the BJT 1008 is turned on by the control signal $V_{CONTROL}$ presenting a suitable voltage to the base of the BJT 1008. In a second state, the base of the BJT 1008 is pulled down by the FET 1012, which conducts when the receiver voltage $V_{out}$ exceeds a threshold value. This threshold value is set by the voltage divider formed by resistors 1016 and 1018. Thus, before a predetermined power limit is reached, as the voltage and power dissipated in the resistor 1006 rises the FET 1012 begins conducting and reduces the current drawn by the current source (e.g., the BJT 1008). As a further non-limiting example, as previously described in connection with FIGS. 13 and 14, the control signal 1308/1408 may cause the FETs 1306/1406 to couple and decouple the load (e.g., the resistor 1304 in FIG. 13 and the resistor 1412, the diode 1410 and the inductor 1404 in FIG. 14) from the receiver by connecting and disconnecting the load to the ground voltage with a first duty cycle that results in a first level of average power dissipated in the load and with a second duty cycle that results in a second level of average power dissipated in the load that is greater than the first level.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary implementations herein.

The various illustrative logical blocks, modules, and circuits described in connection with the exemplary implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary implementations disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary implementations is provided to enable any person skilled in the art to make or use such implementations. Various modifications to these exemplary implementations will be readily apparent to those skilled in the art, and the generic principles defined herein may be applied to other implementations without departing from the spirit or scope of the present application. Thus, the present application is not intended to be limited to the exemplary implementations shown herein but is to be accorded the widest scope consistent with the principles and novel features disclosed herein.

What is claimed is:

1. An apparatus for communicating with a wireless power transmitter, the apparatus comprising:
   a receiver configured to generate a voltage based on charging power wirelessly received from the transmitter;
   a load configured to be coupled to and decoupled from the receiver based on a duty cycle; and
   a switching circuit configured to receive a control signal comprising the duty cycle and configured to encode a communication from the receiver to the transmitter based on adjusting an average power dissipated by the load, the average dissipated power based on the duty cycle with which the switching circuit couples and decouples the load under control of the control signal, wherein the communication comprises indicating a presence of the receiver in a charging region of the transmitter based on coupling and decoupling the load based on the control signal for a predetermined interval of time.

2. The apparatus of claim 1, wherein the switching circuit is configured to adjust the average power dissipated by the load by selectively adjusting the duty cycle between a first duty cycle corresponding to a first level of average power dissipated by the load and a second duty cycle corresponding to a second level of average power dissipated by the load, the second level being greater than the first level.

3. The apparatus of claim 2, wherein the communication is detectable by the transmitter based on a variation between the first level of average power dissipated by the load and a second level of average power dissipated by the load.

4. The apparatus of claim 1, wherein the switching circuit comprises a transistor configured to electrically connect the load to a ground voltage in a coupled state and electrically isolate the load from the ground voltage in an uncoupled state.

5. The apparatus of claim 1, wherein the load comprises one or more of a resistor, a diode, an inductor, a current source comprising a transistor, or any combination thereof.

6. The apparatus of claim 1, wherein the communication comprises at least one of:
   a message indicative of one or more characteristics relating to power transfer between the transmitter and the receiver,
   an indication of a presence of the receiver in a charging region of the transmitter, or
   any combination thereof.

7. The apparatus of claim 1, wherein the communication is encoded as a modulation of a level of the charging power wirelessly received by the receiver from the transmitter via a magnetic field.

8. The apparatus of claim 1, wherein the switching circuit is configured to pull down a level of the control signal to reduce an average power dissipated by the load when the voltage exceeds a predetermined value.

9. The apparatus of claim 1, further comprising:
   a current sensor configured to measure a current flowing through the load;
   a multiplier configured to determine the average power by multiplying the voltage by the current; and
   a driver circuit configured to control the switching circuit based on the determined average power.

10. The apparatus of claim 1, further comprising:
    a multiplier configured to determine an average power by multiplying the voltage by another voltage appearing across the load; and
    a driver circuit configured to control the switching circuit based on the determined average power.

11. The apparatus of claim 1, wherein the duty cycle is adjusted according to a characteristic pattern.

12. A method of communicating between a wireless power transmitter and a wireless power receiver, the method comprising:

wirelessly receiving charging power from the transmitter to generate a voltage at the receiver, receiving a control signal at a switching circuit, the control signal comprising a duty cycle, encoding a communication from the receiver to the transmitter based on adjusting an average power dissipated by a load of the receiver, the average dissipated power based on the duty cycle at which the load is coupled to and decoupled from the receiver under control of the control signal, wherein the communication comprises indicating a presence of the receiver in a charging region of the transmitter based on coupling and decoupling the load based on the control signal for a predetermined interval of time.

13. The method of claim 12, further comprising adjusting the average power dissipated by the load based on selectively adjusting the duty cycle between a first duty cycle corresponding to a first level of average power dissipated by the load and a second duty cycle corresponding to a second level of average power dissipated by the load, the second level being greater than the first level.

14. The method of claim 12, wherein the load is coupled to the receiver when the load is electrically connected to a ground voltage by a transistor and the load is decoupled from the receiver when the load is electrically isolated from the ground voltage by the transistor.

15. The method of claim 12, wherein the load comprises one or more of a resistor, a diode, an inductor, a current source comprising a transistor, or any combination thereof.

16. The method of claim 12, wherein the communication comprises at least one of:
a message indicative of one or more characteristics relating to power transfer between the transmitter and the receiver,
an indication of a presence of the receiver in a charging region of the transmitter, or
any combination thereof.

17. The method of claim 12, further comprising pulling down a level of the control signal to reduce an average power dissipated by the load when the voltage exceeds a predetermined value.

18. An apparatus for communicating with a wireless power transmitter, the apparatus comprising:
means for generating a voltage based on wirelessly received charging power from the transmitter;
means for receiving a control signal comprising a duty cycle; and
means for encoding a communication from the apparatus to the transmitter based on adjusting an average power dissipated by a load of the apparatus, the average power based on the duty cycle with which the means for encoding the communication couples and decouples the load from the apparatus under control of the control signal,
wherein the communication comprises indicating a presence of the apparatus in a charging region of the transmitter based on coupling and decoupling the load based on the control signal for a predetermined interval of time.

19. The apparatus of claim 18, wherein the means for encoding the communication further comprises means for adjusting the average power dissipated by the load by selectively adjusting the duty cycle between a first duty cycle corresponding to a first level of average power dissipated by the load and a second duty cycle corresponding to a second level of average power dissipated by the load, the second level being greater than the first level.

20. The apparatus of claim 18, wherein the means for encoding the communication comprises a transistor configured to electrically connect the load to a ground voltage in a coupled state and electrically isolate the load from the ground voltage in an uncoupled state.

21. The apparatus of claim 18, wherein the load comprises one or more of a resistor, a diode, an inductor, a current source comprising a transistor, or any combination thereof.

22. The apparatus of claim 18, wherein the means for encoding the communication comprises means for pulling down a level of the control signal to reduce an average power dissipated by the load when the voltage exceeds a predetermined value.

* * * * *